United States Patent
Prantner et al.

(10) Patent No.: US 11,416,293 B2
(45) Date of Patent: Aug. 16, 2022

(54) CONTROL UNIT HAVING A SCHEDULER FOR SCHEDULING A PLURALITY OF VIRTUAL MACHINES, AND METHODS FOR SCHEDULING A PLURALITY OF VIRTUAL MACHINES

(71) Applicant: OpenSynergy GmbH, Berlin (DE)

(72) Inventors: Heinz Prantner, Berlin (DE);
Shantanu Singh Bundela, Berlin (DE);
Pierre-Antoine Bernard, Berlin (DE);
Michael Peter, Berlin (DE)

(73) Assignee: OpenSynergy GmbH, Berlin (DE)

( * ) Notice: Subject to any disclaimer, the term of this patent is extended or adjusted under 35 U.S.C. 154(b) by 246 days.

(21) Appl. No.: 16/755,135

(22) PCT Filed: Oct. 2, 2018

(86) PCT No.: PCT/EP2018/076722
§ 371 (c)(1),
(2) Date: Apr. 9, 2020

(87) PCT Pub. No.: WO2019/072624
PCT Pub. Date: Apr. 18, 2019

(65) Prior Publication Data
US 2020/0326980 A1    Oct. 15, 2020

(30) Foreign Application Priority Data

Oct. 10, 2017   (EP) ..................................... 17195697

(51) Int. Cl.
*G06F 9/455*    (2018.01)
*G06F 9/46*    (2006.01)
(Continued)

(52) U.S. Cl.
CPC ........ *G06F 9/4887* (2013.01); *G06F 9/45558* (2013.01); *G06F 9/5038* (2013.01); *G06F 2009/4557* (2013.01)

(58) Field of Classification Search
CPC .. G06F 9/4887; G06F 9/45558; G06F 9/5038; G06F 2009/4557
(Continued)

(56) References Cited

U.S. PATENT DOCUMENTS

| 7,356,817 B1 | 4/2008 | Cota-Robles et al. |
| 7,454,752 B2* | 11/2008 | Masuoka ................ G06F 9/542 714/48 |
| 2016/0212065 A1* | 7/2016 | To ......................... H04L 47/525 |

FOREIGN PATENT DOCUMENTS

| EP | 1983433 A1 | 10/2008 | |
| EP | 3343366 A1 * | 7/2018 | ........... G06F 9/3836 |

OTHER PUBLICATIONS

Masrur, A. et al., "Designing VM Schedulers for Embedded Real-Time Applications," Proceedings of the Ninth IEEE/ACM/IFIP International Conference on Hardware/Software Codesign and System Synthesis (CODES+ISSS), Oct. 9-14, 2011, pp. 29-38.
(Continued)

*Primary Examiner* — Bradley A Teets
(74) *Attorney, Agent, or Firm* — Soquel Group LLC

(57) ABSTRACT

A control unit including at least one processor and at least one memory connected to the at least one processor, a virtualization system, the virtualization system including a scheduler for scheduling a plurality of virtual machines to assign processing time to each of the virtual machines according to a predetermined fixed sequence of virtual machine switches forming a cycle period, which is repeated, the cycle period being the minimum time period after which the scheduling is repeated, wherein the virtualization system and the plurality of virtual machines are real-time systems,
(Continued)

the virtual machines having respectively at least one real-time attribute, wherein at least one the real time attribute of a first virtual machine are different to the corresponding real-time attribute(s) of a second virtual machine, wherein predetermined fixed sequence of virtual machine switches is calculated based on the at least one real time attribute.

19 Claims, 7 Drawing Sheets

(51) Int. Cl.
  *G06F 9/48* (2006.01)
  *G06F 9/50* (2006.01)
(58) Field of Classification Search
  USPC ........................................................ 718/102
  See application file for complete search history.

(56) References Cited

OTHER PUBLICATIONS

International Search Report for Patent Application No. PCT/EP2018/076722, dated Dec. 13, 2018, 2 pp.

* cited by examiner

CONTROL UNIT HAVING A SCHEDULER FOR SCHEDULING A PLURALITY OF VIRTUAL MACHINES, AND METHODS FOR SCHEDULING A PLURALITY OF VIRTUAL MACHINES

CROSS-REFERENCE TO RELATED APPLICATIONS

This application claims benefit under 35 USC § 371 of PCT Application No. PCT/EP2018/076722 entitled CONTROL UNIT, METHOD FOR OPERATING A CONTROL UNIT, METHOD FOR CONFIGURING A VIRTUALIZATION SYSTEM OF A CONTROL UNIT, filed on Oct. 2, 2018 by inventors Heinz Prantner, Shantanu Singh Budela, Pierre-Antoine Bernard and Michael Peter. PCT Application No. PCT/EP2018/076722 claims priority of European Patent Application No. 17 195 697.2, filed on Oct. 10, 2017.

FIELD OF THE INVENTION

The present invention concerns a control unit is provided, the control unit comprising at least one processor and at least one memory connected to the processor, the control unit further comprising a virtualization system and a plurality of virtual machines running on the virtualization system.

Further, the present invention relates to a method for operating a control unit according to one of the preceding claims, the control unit comprising at least one processor and at least one memory connected to the processor, the control unit further comprising a virtualization system and a plurality of virtual machines running on the virtualization system.

Additionally, the present invention relates to a method for configuring a virtualization system of a control unit, the control unit comprising at least one processor and at least one memory connected to the processor, the control unit further comprising a virtualization system and a plurality of virtual machines running on the virtualization system.

BACKGROUND OF THE INVENTION

Typically, embedded systems have a high number of functional requirements and non-functional requirements to cope with, for example complexity, multi-core architectures, safety, security, software integration and software update.

Virtualization systems are provided to suitable address above challenges, so that specific tasks are modularized and separated. Further resources are shared and different virtual machines can be updated independently.

However, such systems, comprising a plurality of virtual machines are not efficient in particular situations, for example if tasks have short execution times and periods, the number of tasks and/or events are high, the number of task switches is high, the granularity of timer events is high and the number of input/output ports and therefore the number of input/output operations is high. Further, in such systems, often the processor has a relative low performance due to the relative simple tasks to perform.

In other systems, within one scheduling cycle all existing virtual machines must be scheduled by the hypervisor one after the other, resulting in hypervisor scheduler timeouts in the range of fractions of milliseconds, introducing a high overhead on scheduling costs.

The provisioning of multi-core architectures by hardware vendors also for small footprint, low end systems, providing increased computing power, still constitutes a significant problem for software makers, in how to use such a multi core architecture and how to assign and distribute scheduling entities such as tasks, processes to physical cores and keeping control of the handling of the complexity arising with such a distributed computing environment.

SUMMARY OF THE DESCRIPTION

Object of the invention is to provide a method and a system, which is usable for low footprint, event and input/output intensive, and real-time control units.

According to an aspect, a control unit is provided, the control unit comprising at least one processor and at least one memory connected to the processor, the control unit further comprising a virtualization system and a plurality of virtual machines running on the virtualization system, the virtualization system including a scheduler for scheduling the plurality of virtual machines to assign processing time to each of the virtual machines according to a predetermined fixed sequence of virtual machine switches forming a cycle period, which is repeated, the cycle period being the minimum time period after which the scheduling is repeated, wherein the virtualization system and the plurality of virtual machines are real-time systems, the virtual machines having respectively at least one real-time attribute, wherein at least one the real time attribute of a first virtual machine are different to the corresponding real-time attribute(s) of a second virtual machine, wherein predetermined fixed sequence of virtual machine switches is calculated based on the at least one real time attribute.

Further embodiments may include the following features in any feasible combination:
  one of the real-time attributes is a maximum allowed response time;
  each virtual machine includes a plurality of periodic tasks having respectively a task period, wherein one of the real-time attributes is a greatest common denominator of the task periods of the respective virtual machine, wherein the predetermined fixed sequence of virtual machine switches being calculated based on the at least one real time attribute includes periodic scheduling the virtual machines according to the greatest common denominator of the task periods of the respective virtual machine;
  each virtual machine includes a plurality of periodic tasks having respectively a task period, wherein one of the real-time attribute is a set of task periods, wherein the set of task periods of a respective virtual machine includes task periods of tasks of the virtual machine without task periods of tasks of the same virtual machine, which are multiples of other task periods, wherein at least one virtual machine has a set of task periods including two task periods, wherein the predetermined fixed sequence of virtual machine switches calculated based on the real time attributes includes scheduling according to the individual task periods of the set of task periods of the respective virtual machine;
  wherein within a cycle period at least one of the virtual machines is scheduled at least two times, in particular at least three time, for example at least four times, wherein the sequence of the scheduled the virtual machines is variable within the cycle period;
  the lowest task period in the first set of task periods is different to the lowest task period in the second set of task period, in particular to the lowest task period of the set of task periods of all other virtual machines, wherein, in particular the lowest task period of the first set of task periods is lower that the lowest task period of the second set of task periods and not a whole number factor of the lowest task period of the second set of task periods;

the scheduling of a first virtual machine is shifted in time with respect to the scheduling of a second virtual machine by at least one task period granularity, the task period granularity is the greatest common denominator of the task periods of all virtual machines;

wherein each virtual machine has a predetermined share of the cycle period, wherein in particular each virtual machine has the same share of the cycle period or wherein the virtual machines have an unequal share;

the control unit includes an SRAM, in particular less than 2 Megabytes, for example less than 512 kilobytes, and/or wherein the memory is a NOR-Flash for storing program code.

According to a further aspect, a method for operating a control unit according to one of the preceding claims, the control unit comprising at least one processor and at least one memory connected to the processor, the control unit further comprising a virtualization system and a plurality of virtual machines running on the virtualization system, the virtualization system including a scheduler for scheduling the plurality of virtual machines to assign processing time to each of the virtual machines according to a predetermined fixed sequence of virtual machine switches forming a cycle period, which is repeated, the cycle period being the minimum time period after which the scheduling is repeated, wherein the virtualization system and the plurality of virtual machines are real-time systems, the virtual machines having respectively real-time attributes, wherein the real time attributes of a first virtual machine is different to the real-time attributes of a second virtual machine, the method comprising: switching, by the scheduler, to the first virtual machines according to the predetermined sequence based on the real-time attributes.

According to a further aspect, a method for configuring a virtualization system of a control unit, the control unit comprising at least one processor and at least one memory connected to the processor, the control unit further comprising a virtualization system and a plurality of virtual machines running on the virtualization system, the virtualization system including a scheduler for scheduling the plurality of virtual machines to assign processing time to each of the virtual machines according to a predetermined fixed sequence of virtual machine switches forming a cycle period, which is repeated, the cycle period being the minimum time period after which the scheduling is repeated, wherein the virtualization system and the plurality of virtual machines are real-time systems, the virtual machines having respectively real-time attributes, the method comprising:

determining the real-time attributes of each task;

assigning the tasks to different virtual machines, such that a first virtual machine have different real-time attributes compared to a second virtual machine;

determining the share of each virtual machine within a cycle period;

determining the nominal scheduling times for each virtual machine based on the real time attributes of the virtual machines;

determining real scheduling times based on the nominal scheduling times and the share of each virtual machine within a cycle period, and storing the real scheduling times as a scheduling schedule to be read and executed by a scheduler of the virtualization system, wherein the scheduling schedule represents the predetermined fixed sequence of virtual machine switches.

Further embodiments may include the following features in any feasible combination:

each virtual machine includes a plurality of periodic tasks having respectively a task period, the method comprising determining greatest common denominator of the task periods of each virtual machine, wherein the real-time attribute is a greatest common denominator of the task periods of the respective virtual machine;

each virtual machine includes a plurality of periodic tasks having respectively a task period, the method comprising:

determining a set of task periods, wherein the set of task periods of a respective virtual machine includes task periods of tasks of the virtual machine without task periods of tasks of the same virtual machine, which are multiples of other task periods, wherein the real-time attribute is a set of task periods and at least one virtual machine has a set of task periods including two task periods;

the method further comprising:

determining the stress and/or number of virtual machine switches per a predetermined of time, shifting all nominal scheduling times of at least a first virtual machine with respect to the all nominal scheduling times of a second virtual machine by at least one task period granularity in order to reduce the stress and/or the number of virtual machine switches to be performed by the scheduler, wherein the stress is, for any scheduling point for a given virtual machine, the minimal distance in time to the next scheduling points for all other virtual machines;

the method further comprising reading and executing the scheduling schedule by a scheduler of the virtualization system For example, the control unit may be used in a vehicle.

According to another aspect, a computer program product is provided, comprising commands for executing the method according to an embodiment disclosed herein, when loaded and executed on one or more processors. According to an embodiment a computer program product may be a physical software product, for example a hard disc, a solid state disc, a CD-ROM, a DVD, comprising the program.

According to other aspects, the present invention relates to non-volatile memory, for example a hard disc, a solid state disc, a CD-ROM, a DVD, including a program containing commands for executing the method according an embodiment disclosed herein, when loaded and executed on a processor.

With the given method, guest operating systems are addressed running inside a VM with real-time requirements, with repeating, cyclical task loads, a fixed configuration, with an objective on predictable system behavior and with an expectation by the virtual machine for guarantees on quality of service.

BRIEF DESCRIPTION OF THE DRAWINGS

Further advantages, features, aspects and details are evident from the dependent claims, the description and the drawings.

DETAILED DESCRIPTION

Figure 1:
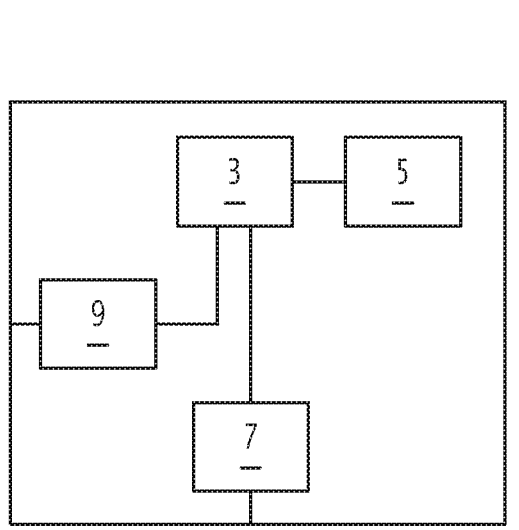
FIG. 1 shows schematically a control unit according to an embodiment.

FIG. 1 shows schematically an electronic control unit (ECU) 1. The ECU 1 might be also called control unit in the present patent application. For example, the ECU 1 is realized as a system on chip (SoC). According to an embodiment, an ECU comprises one or more processors 3 forming at least one central processing unit (CPU) connected to one or more memories 5. The memory 5 is, according an embodiment, is provided for a in place execution (XIP) and/or is a NOR-Flash memory. The NOR-flash memory is provided for storing virtual machines or the hypervisor.

The at least one processor 3 comprises one or more processor cores. For example, the at least one processor may include c processor cores. The processor cores are independent processing units that read and execute program instructions. In case of multiple processor cores, these are typically on the same integrated circuit die.

For example, the at least one processor 3 has a frequency of less than 300 MHz. The processor 3 has a memory protection unit (MPU), but not a memory management unit (MMU). According to some embodiments, which may be combined with other embodiments disclosed herein, the at least one processor 3 as a small amount of internal SRAM (Static Random Access Memory), in particular less than 2 MByte, for example less than 512 kByte. Given the high speed data read and write access by SRAM only an instruction cache is necessary.

Further, the ECU 1 may comprise an interface for connecting to one or more bus systems, for example one or more hardware controller 7 for at least one controller area network (CAN) bus, one or more hardware controller for at least one industrial Ethernet connection and/or one or more hardware controller 9 for at least one FlexRay bus (not shown). CAN and FlexRay bus systems are dedicated for use in automotive vehicles. In other embodiments the ECU 1 may include interfaces for other bus system, like LIN (Local Interconnect Network), 12C (Inter-Intergrated Circuit), SPI (Serial Peripheral Interface), or UART (Universal Asynchronous Receiver Transmitter).

Further, in some embodiments, the processor architecture of the at least one processor 3 provides support for virtual CPU's. The scheduling of virtual machines (VM's) by the hypervisor and the switching between them involves the switching of virtual CPU (vCPU) instances including static attributes such as the current context, but also dynamic aspects such as CPU events (reset, interrupt, exception, timer and syscall). The processor hardware supports the OS scheduling of tasks or multi-tasking, by providing a particular CPU mode, for privileged, scheduler versus non-privileged, user mode of operation. The newer generations of processor hardware may facilitate the scheduling of virtual machines, by the introduction of new exception levels, for hypervisor, operating system and user mode of operation. A scheduler, or operating system, gets control over the system by CPU events (listed above) or exceptions. Modern computer architectures introduce a plurality of so called exception layers or levels for the support of hierarchical scheduling like in virtualization systems. This allows to configure and control a system to have interrupts, timer, syscalls etc. occurring on those distinct layers, for providing for example a separate and distinct timer interrupt for the hypervisor and one for the second level scheduler (in the virtual machine) with support by the hardware. Without hardware virtualization support those hardware events need to be mimicked by the hypervisor for the paravirtualized virtual machine operating system to function as in native environments.

Usually, an automotive vehicle comprises a plurality of electronic control units 1 (ECU), which may be assigned to different units of the vehicle, for example the steering wheel, the brakes, the windows, the motor etc. For example, the ECU may be connected to some sensors, drivers and/or actuators via an interface, for example to drive the window, or to sense the angulation of the steering wheel, the rotation of the wheels, the level and/or temperature of oil or water in the motor. The sensors may provide data at a high frequency, for example the sensors detecting the rotation of the wheels.

Figure 2:
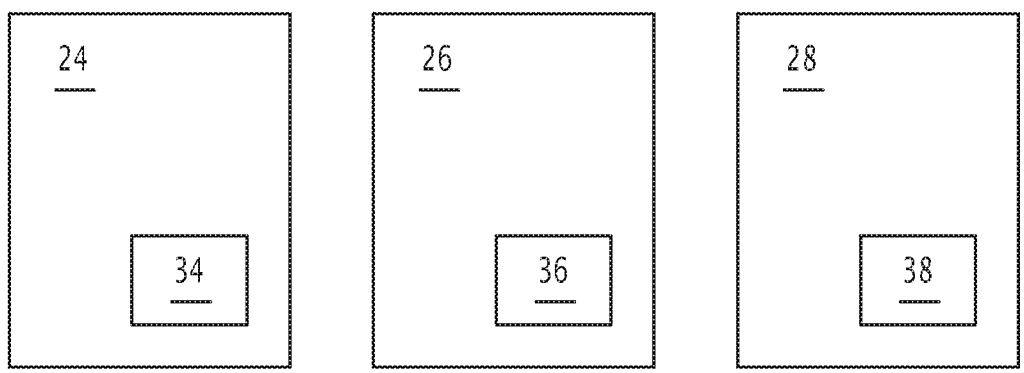
FIG. 2 shows schematically a system according to an embodiment.
Figure 2:
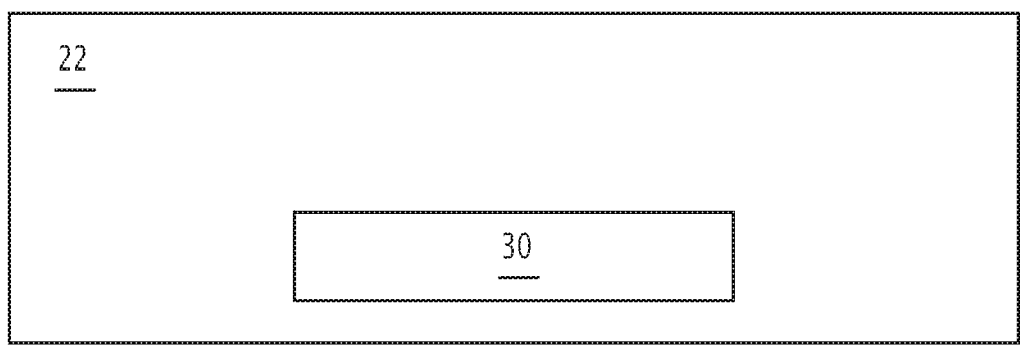
Figure 2:
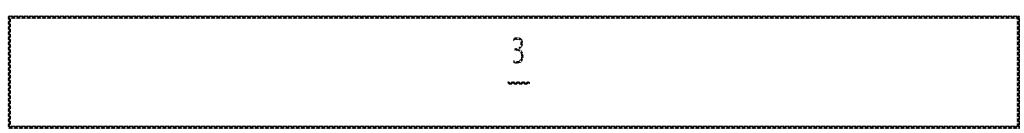

FIG. 2 shows schematically a system 20 according to an embodiment. The system 20 includes a virtualization system 22, running on the at least one processor or CPU (central processing unit) 3, and a plurality of virtual machines 24, 26, 28, for example guest operating systems, each running in a separate partition. The virtual machines 24, 26, 28 are running via the virtualization system 22, for example a hypervisor, on the at least one processor 3 of the ECU 1. In other words, the virtualization system 22 enables several operating systems to simultaneously run on the one or more processors 3. The number of virtual machines is not limited to three virtual machines 24, 26, 28, the system may include even less or more virtual machines, for example four, five, six, seven, or more virtual machines.

One example of a virtualization system 22 is a hypervisor between the hardware, in particular the at least one processor 3 and/or the at least one memory 5, and virtual machines 24, 26, 28. According to an embodiment, the system includes n virtual machines.

A Virtual Machine (VM) may comprise a guest operating system, in particular a real time operating system, or a simple scheduler, and/or some basic software and software application, implementing some software function with requirements for access to CPU time, to memory- and to IO (Input/Output)—resources, and access to inter partition communication (IPC). A Virtual Machine (VM) comprises one or more Virtual CPU's (vCPU's), where each vCPU is assigned to one distinct physical processor core (CORE), in case the processor 3 includes a plurality of cores.

The virtualization system 22 is adapted to run directly on the hardware, in particular the at least one processor 3, to control the hardware and to manage the virtual machines 24, 26, 28. The virtualization system 22 is adapted to define a simulated hardware for the virtual machines installed, for example a virtual central processing unit (vCPU). Further, the virtualization system 22 is adapted to assign the hardware resources to the respective virtual machines, for example the processor time and/or memory to the respective virtual machines and to provide inter partition communication (IPC) links between the different virtual machines 24, 26, 28, so that the virtual machines are able to communicate with each other. Further, the virtualization system 38 separates the different virtual machines to avoid interference between the virtual machines 24, 26, 28. In particular the virtualization system 22 is adapted to provide advanced time management and scheduling, which will be explained later.

According to embodiments, the system 20 is designed to provide a plurality of components, which are assigned to the virtual machines 24, 26, 28. Each component may include one or more tasks. The components are used to modularize complex systems. For example, each component may have a different function in the system.

Each task has task attributes and task characteristics, in particular task periods for periodic tasks, a minimum inter-arrival time for sporadic tasks, task priority, and/or worst case or maximum allowed execution times. The assignment of task priority and period is derived from the needs or constraints of an hardware controller, hardware queue sizes, processor speed, communication speed and bandwidth, memory sizes and queue sizes, access times, delay times, defined maximum allowed response times and other real-time acceptance criteria.

According to embodiments, virtual machines are isolated from each other, with respect to the access to resources, processing time, memory, peripheral devices, where each virtual machine gets a share of the access to resources per the defined needs for each virtual machine.

Further, virtual machines are attributed with respect to their real-time requirements, for example their maximum allowed response time and/or the set of tasks periods of the tasks, wherein the set of task periods of a respective virtual machine includes task periods of tasks of the virtual machine, without task periods of tasks of the same virtual machine, which are multiples of other task periods. In other word, the task periods of all tasks of a particular virtual machine are represented by the set of task periods either by the task period itself or by being a multiple of a task period of the set of task periods.

The set of task periods determines at which (nominal) time intervals a virtual machine need to be scheduled. Further, the maximum allowed response time to input stimulus of the virtual machine is also determined by the task periods of the virtual machine.

According to an embodiment, the virtual machines are classified with respect to their real-time attributes, in particular the maximal allowed response time and/or the set of task periods, in order to reduce the number of virtual machine switches, as it will be shown in this disclosure.

In the following, the scheduling of the virtual machines is further explained, based on the task periods of periodic tasks.

Given a set of Virtual Machine M={VM$_0$, VM$_1$, ..., VM$_{n-1}$} a scheduler 30 assigns processor processing time T$_j$ to each virtual CPU vCPU$_j$, assigned to a Virtual Machine VM$_i$, per physical processor core CORE$_k$, for all n number of VM's, for all v number of vCPU's (per VM), and for all c number of processor cores. In other words each VM gets a share or time slice of processing time. If only one CPU core is existing, the number v of vCPUs per VM is 1 and the number of vCPUs corresponds to the total number n of virtual machines.

The scheduler 30 has a basic granularity (time base) to schedule different vCPUs. The basic granularity (time base) is the minimal time period, at which at which the scheduler can switch from a first virtual machine to a second virtual machine. Further, according to embodiments, there is a task period granularity G, which depends on the task periods of the virtual machines. According to embodiments, the task period granularity G is the greatest common denominator of the task periods of all virtual machines. For example, if virtual machines have 2 ms and 5 ms tasks, the resulting overall task period granularity G is 1 ms. According to embodiments, the task period granularity G is at least 300 times the basic granularity (time base), for example 500 times the basic granularity. In the following the calculation of the VM switches will be based on the task period granularity G.

One Virtual Machine VM$_i$ can have one or more virtual CPUs vCPU$_j$ assigned, where each vCPU$_j$ is assigned to one CPU core CORE$_k$.

According to an embodiment, each Virtual Machine VM$_i$ is a host for a real time OS serving periodic tasks with a multitude of task periods P$_l$.

The system 20 must be capable to properly function for potentially many different system setups, or patterns.

According to embodiments, for each possible and valid system setup, with consideration of real-time and domain specific requirements, means are provided to calculate a schedule for an optimal solution for assigning CPU processing time to vCPUs.

According to an embodiment, a schedule in form of a defined data structure containing instances of schedule entries is provided. For the generated schedule, repeating patterns are identified to provide a cycle for the given schedule for the given system setup. For example, according to an embodiment, the scheduling of virtual machines repeats every cycle. In other words, the cycle period is the period in which a (predetermined fixed) sequence of virtual machines switches is repeated.

For a non-optimized, uniform, scheduling, where all vCPU's are scheduled monotonically, round robin, TDMA, one after the other within one cycle, we get x=vc number of scheduling points per one cycle for each CPU core, with vc number of vCPUs for one CPU core.

For obtaining a schedule, at a first step, each virtual machine is studied separately, to determine the scheduling points for that virtual machine.

According to the invention, with the scheduler 30, where each vCPU is scheduled per task period needs, the need to be scheduled $x_{jlt}$ for one vCPU j for one task period P$_{jl}$ at any point in time t is calculated as follows:

$$x_{jlt}=f(P_{jl},t)\equiv(\text{floor}((P_{jl}-(t' \text{ modulo } P_{jl}))\div P_{jl}))\in\{0,1\} \quad \text{Equation (1)}$$

with floor we mean whole number integer division, where j refers to one vCPU$_j$ and l refers to one task period P$_{jl}$ of that vCPU$_j$, and t' is one point in time aligned to guest OS task periods granularity G (with, e.g. G=1 ms). For example t' may be calculated as follows:

$$t'=t-(t \text{ modulo } G) \quad \text{Equation (2)}$$

The granularity denotes the guest system task period base (e.g. 1 ms, providing the base for 2 ms and 5 ms task periods as already explained above). The task period P$_{lj}$ is the period, specifying at which time intervals a given guest OS task has to be scheduled on the vCPU j. The virtualization system 22 has only a notion of task periods, and does not know individual tasks, they will be scheduled by the respective guest VM. There may be up to p different task periods for each vCPU.

$x_{jlt}=1$ means that the vCPU$_j$ need to be scheduled at the given point in time t, where $x_{jlt}=0$ indicates that there is no such need at that time t.

Thus, over a period, the $x_{jlt}$ gives a sequence of "1" and "0" for each point in time t or timeslot t'. The point in time t may designate a specific time slot t' of size granularity G. In other words, a point in time t is always also one point in time t' or time slot. For example, a sequence for a time period granularity G of 1 ms, a single vCPU, and a task period of 2 ms may be as follows (the observation period is 20 ms):

TABLE 1

| t'        | 0 | 1 | 2 | 3 | 4 | 5 | 6 | 7 | 8 | 9 | 10 | 11 | 12 | 13 | 14 | 15 | 16 | 17 | 18 | 19 |
|-----------|---|---|---|---|---|---|---|---|---|---|----|----|----|----|----|----|----|----|----|----|
| $X_{jl}$  | 1 | 0 | 1 | 0 | 1 | 0 | 1 | 0 | 1 | 0 | 1  | 0  | 1  | 0  | 1  | 0  | 1  | 0  | 1  | 0  |

In other words, $X_{jl}$, as an ordered set of $x_{jlt}$, defines the optimal or nominal scheduling points for a specific $vCPU_j$, for one task period I. In this example, there are one or more tasks having a task period of 2 ms.

For another example, for the same vCPU, having at least one task with a task period of 5 ms, the set of $x_{jlt}$ is aligned to modulo 5 for that task as follows:

TABLE 2

| t'        | 0 | 1 | 2 | 3 | 4 | 5 | 6 | 7 | 8 | 9 | 10 | 11 | 12 | 13 | 14 | 15 | 16 | 17 | 18 | 19 |
|-----------|---|---|---|---|---|---|---|---|---|---|----|----|----|----|----|----|----|----|----|----|
| $X_{jl}$  | 1 | 0 | 0 | 0 | 0 | 1 | 0 | 0 | 0 | 0 | 1  | 0  | 0  | 0  | 0  | 1  | 0  | 0  | 0  | 0  |

Then, for a specific, individual $vCPU_j$, the different ordered sets of $x_{jlt}$ are combined. In the following example, for one $vCPU_j$, two task periods of 2 ms and 5 ms are combined to get a consolidated nominal schedule for the specific $vCPU_j$ as follows:

TABLE 3

| t'        | 0 | 1 | 2 | 3 | 4 | 5 | 6 | 7 | 8 | 9 | 10 | 11 | 12 | 13 | 14 | 15 | 16 | 17 | 18 | 19 |
|-----------|---|---|---|---|---|---|---|---|---|---|----|----|----|----|----|----|----|----|----|----|
| $X_{j0}$  | 1 | 0 | 1 | 0 | 1 | 0 | 1 | 0 | 1 | 0 | 1  | 0  | 1  | 0  | 1  | 0  | 1  | 0  | 1  | 0  |
| $X_{j1}$  | 1 | 0 | 0 | 0 | 0 | 1 | 0 | 0 | 0 | 0 | 1  | 0  | 0  | 0  | 0  | 1  | 0  | 0  | 0  | 0  |
| $X_j$     | 1 | 0 | 1 | 0 | 1 | 1 | 1 | 0 | 1 | 0 | 1  | 0  | 1  | 0  | 1  | 1  | 1  | 0  | 1  | 0  |

With the resulting set $X_j$, which combines $X_{j0}$ (task period l=0) and $X_{j1}$ (l=1), it becomes clear, that there are time slots, where the guest OS needs to be triggered, per the requirements from the task period, and that there are other time slots, where no trigger is required. With this notion, consecutive time slots, for example time slots 0 and 1, or 2 and 3, can be concatenated to form sprints of varying length for a given $vCPU_j$. Concatenation of time slots to form sprints starts with 1 and comprises all following 0's. Of course, the individual $VCPU_j$ may include even more tasks with further tasks periods being different from the first and second task periods of 2 ms and 5 ms.

The set of sprint's may vary in length, i.e. where a first sprint length may differ from a second sprint length.

One sprint denotes the atomic unit for the scheduler (hypervisor) for which a vCPU requires a scheduler- or timer-tick (for that virtual machine OS). The series of sprints (with potentially variable length) forms the nominal schedule for a vCPU.

With the notion of nominal scheduling points expressed as sprints, the sprint length at given times, the defined time budget per vCPU, the actual CPU processing time allocated to a particular vCPU, can be calculated.

For each $vCPU_j$ the set $X_j$ is be calculated, which determines the nominal scheduling points. In a further step, it has to be determined, which $vCPU_j$ has to be scheduled at a particular point of time, in particular if several $vCPU_j$ have to be scheduled at the same time slot.

A vCPU which has been dispatched—i.e. is running on the processor—by the hypervisor scheduler 30 may need to be interrupted—preempted—in order to serve another vCPU with a high priority deadline. The vCPU which has been preempted needs to be continued at a later time, in order to get its assigned and guaranteed CPU execution time budget within and per one sprint.

The need to be scheduled is quantified as an eminence indicator, implemented as a scalar in the range, for example from 0 to 1. In other embodiments another scale may be used. According to an embodiment, for each vCPU at a given time an eminence score in the range of 0 to 100 is calculated. An eminence score value of 100 at a given time for a given vCPU indicates that this vCPU needs to be scheduled at a specific time t. An eminence score value of 0 at a given time t for a given vCPU indicates that for this vCPU there is no need to be scheduled at that specific time t.

Values between 0 and 100 indicate the importance or eminence for that vCPU at the time t.

Given all eminence scores $SCORE_{jt}$ for all $VCPU_j$ at a given time t we derive the eminence indicator $EI_{jt}$ per VCPU by normalizing the eminence score $SCORE_{jt}$:

$$EI_{jt} = \frac{SCORE_{jt}}{\sqrt{\sum_{j=0}^{v-1} (SCORE_{jt})^2}} \qquad \text{Equation (3)}$$

Given this eminence measure, the scheduler 30 always schedules the vCPU with the highest eminence indicator $EI_{jt}$ at a given time t.

The eminence score $SCORE_{jt}$ may be calculated as follows:

For example, in case a $vCPU_j$ has completed and fully consumed the budget or processing time for the current sprint s and is now awaiting the next sprint s to be scheduled again. The remaining time until the next sprint s begin—the deadline for the vCPU—determines the eminence score SCORE: the shorter the time left, the higher the score.

With decreasing remaining time we get increasing importance to be scheduled. With this approach a vCPU may get dispatched with a delta to the desired time (which is also called jitter explained here-below), depending on the current context, i.e. given the other vCPU needs, or lack of needs at that time, i.e. a vCPU may get scheduled with a score below 100, or a vCPU may not get scheduled, dispatched, even with a score equal 100.

In another example, a $vCPU_j$ has not completed the current sprint s, because it was preempted, and is now waiting to be continued. The remaining time left until the next sprint, which is next sprint begin $nsb_{jt}$ minus current time t, the length of the current sprint $sl_{jt}$, and the time left for execution, determine the eminence score for this example. In other words, also the maximum allowed response time has, according to embodiments, an influence on the eminence score. Where the maximum allowed response time determines the task periods, which determine the sprint, which determines the eminence of a vCPU at a given time.

The dispatching of two vCPUs on the same CPU core at the same time t is impossible. Given the impossibility the scheduler will dispatch one and after some time the other vCPU, potentially resulting in a jitter.

According to embodiments, stress or congestion is defined as a situation where more than one vCPU needs to be dispatched at the same time t or within a short, predetermined time interval $\delta_t$ per the nominal schedule. In other words, stress occurs, when nominal scheduling points are close to each other.

For the detection and assessment of stress situations, a time interval between one vCPU schedule to all other vCPU schedules for all vCPUs per processor core for all processor cores is calculated for a specific time t and/or time slot t'.

For any scheduling point $x_{j,t}$ for a given $vCPU_j$—within a limited observation period—, the distance in time to the next scheduling point for all other vCPUs is calculated, with a ceiling of size of the granularity G. From this set of distances per vCPU pair the minimum value is maintained.

Low or zero distance or time differences indicate a high stress. A high number of maximal jitter values and/or a high number of jitter occurrences for a given observation period indicate high stress.

It should be noted that active period of a vCPU may be shorter than the duration of a specific time slot, which corresponds to the task period granularity G, so that several vCPUs may be scheduled within a specific time slot.

At the first time slot the vCPUs are scheduled one after the other, resulting in an offset between the nominal scheduling time and the real scheduling time for all vCPUs except the first vCPU.

The desired scheduling time of the respective vCPUs correspond to the nominal scheduling times plus the offset. The difference between the desired scheduling time and the real scheduling time is called jitter.

For distinct system configuration setups, where stress indications apply, a phase shift may be used for the mitigation of stress. A phase shift may be an offset of at least one time slot. A phase shift may also occur as a result of a vCPU dispatch offset. An offset arises from the fact that multiple vCPUs cannot run at the same time on one CPU core. In other words, when the nominal schedule of a second vCPU is shifted with respect to the nominal schedule of a first vCPU this may be called phase shift. For example, in case each vCPU includes tasks with task periods of two milliseconds the nominal schedule of the second vCPU may be shifted with respect to the first vCPU by one millisecond. Table 4 shows a simplified optimal scheduling scheme, where the vCPU2 is shifted with respect to vCPU1 by one millisecond, in case the task period granularity is 1 millisecond. In other words, the vCPU2 has a phase shift of 1 millisecond.

In some embodiments, the offset of a $vCPU_j$ may become bigger than the granularity G, which in this case would correspond to a phase shift for this $vCPU_j$ with respect to the previous vCPUs. If, as already shown for the above example, two vCPUs have to serve 2 ms task periods. If both start in the same time slot having the size of the granularity G (assuming G=1 ms in this example) the future timer ticks for activating both vCPU will also happen at the same time slot, with timeouts every even time slot (0, 2, 4, . . . ), and no event every odd time slot (1, 3, 5, . . . ), i.e. they are running synchronous. If the second vCPU were started with an offset greater than G (and smaller 2*G), they would run asynchronous, with timer tick events in even time slots for first vCPU, and timer tick events at odd time slots for the second vCPU as shown above in the table 4.

For the hypervisor scheduler more vCPU switches at a given time slot means more work, and no vCPU switch at a given time slot means no work. Having multiple vCPUs with timeouts or timer ticks in same time slot increases the chance for introducing jitter, when timeouts come close together in time. The introduction of a phase shift can relax the scheduler load of the scheduler 30 and can reduce jitter times and occurrences.

According to embodiments, an additional parameter allows that a phase shift is defined for a respective vCPU, for example by a system integrator. For example, a phase shift for a given vCPU must be equal or bigger than the phase shift of the previous vCPUs. Thus, according to an embodiment upon start-up of the system, a first vCPU 0 is started and then, with increasing time, incrementally one or more further vCPUs 1, 2, . . . are started. Then, the previous vCPU for vCPU1 is the vCPU0 and the previous vCPU for vCPU2 is the vCPU1 and so on. For example one additional vCPU per time slot of size of granularity G is started. Hence, the vCPUs have no or fewer interferences, and no or fewer jitter occurrences and/or no or smaller jitter times over time.

In a further embodiment, the scheduler 30 is adapted to calculate a phase shift automatically.

If the notion of scheduling needs are applied to all Task Periods per vCPU, all vCPUs on a given CPU core, to all CPU cores, for a given observation period, a schedule is obtained, which assigns CPU time with a defined budget to a given vCPU at a given time. Based on a particular system configuration, defined by the particular instances of concepts and their relation, given a sufficient long enough observation period, repeating patterns in the produced schedule can be identified, which will be the cycle for that system 20.

The scheduler 30 of the virtualization system is a first level scheduler interacting directly with the underlying at least one processor 3, the at least one memory 5, interrupt controller and/or peripherals.

TABLE 4

| t' | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| $X_{VCPU1}$ | 1 | 0 | 1 | 0 | 1 | 0 | 1 | 0 | 1 | 0 | 1 | 0 | 1 | 0 | 1 | 0 | 1 | 0 | 1 | 0 |
| $X_{VCPU2}$ | 0 | 1 | 0 | 1 | 0 | 1 | 0 | 1 | 0 | 1 | 0 | 1 | 0 | 1 | 0 | 1 | 0 | 1 | 0 | 1 |

The offset of one vCPU is determined by the runtime of the other, previous vCPUs, including potential preemption, and denotes the time delta from time 0 until the vCPU is dispatched the first time. This also introduces a notion of local versus global time, where the local time of a $vCPU_j$ starts with 0 at global time equals to the offset of the $vCPU_j$. For example, in the above table, the vCPU2 has an offset of 1 millisecond, so that the local time of the vCPU2 starts one millisecond later than the global time t.

As already stated above, the scheduling entities of the scheduler 30 are virtual CPUs (vCPU) belonging or assigned to virtual machines. According to embodiments, the scheduler 30 is responsible for scheduling one or more vCPUs and thus the virtual machines 24, 26, 28 on the at least one physical processor 3 and/or the cores of the processor 3.

In other words, the scheduler 30 is responsible for the allocation of processor time of the at least one processor 3 to a multitude of virtual CPUs (vCPU) and thus the respective virtual machines 24, 26, 28 using the underlying at least one processor, for example a multicore processor, and the time slices of the at least one processor 3 within an overall cycle period in order that each vCPU and thus the virtual machines 24, 26, 28 gets their proper (per configuration) and deterministic share of computing processing power in time.

Each vCPU is associated to a virtual machine, which may include a second level scheduler, or a guest operating system, or a guest real-time operating system 34, 36, 38 as the second level scheduler, utilizing the at least one processor 3 and platform resources and time per its allocated and configured share. The virtual machine scheduler 34, 36, 38 is adapted to schedule the tasks in the virtual machine, after the virtual machine has been activated by the virtualization system scheduler 30, virtually running on a CPU, provided by the underlying hardware and/or virtualization system 22. The guest OS (operating system) implementation, by that, is equal or very similar to a comparable native implementation.

According to embodiments, the virtual machine, depending on the underlying platform, may act as a native implementation (with hardware virtualization support provided by the platform), or may be para-virtualized (modified to use a para-virtualization interface) in order to run on top of the virtualization system 22, as already explained above.

According to embodiments, an operating system, or: both, the first and second level scheduler 30, 34, 36, 38 rely on the environment (periphery, CPU and OS-User) to get control on the system, become active by the following events (logical view, independent of the actual implementation): reset, timer, interrupt, exception and syscall.

At the present invention, the scheduling is optimized with respect to periodic timer events by reducing the number of vCPU switches to a minimum. However, it is not excluded that other events may be also happen and require the activation of a specific virtual machine.

The CPU serves the needs of the operating system. The operating system serves the needs of the application, program running on the operating system. The application serves the needs of the system, the system serves the needs of the user.

The needs of the application are processing and computing power, access to memory and IO (input/output) resources.

The scheduling of the hypervisor is driven by needs and constraints, where the needs for CPU time of one virtual machine are the time constraints for other virtual machines.

Tasks and Interrupt Service Routines (ISR) are the essential entities of a real-time operating systems which is scheduled by the guest operating systems, for example an AUTOSAR OS according to the AUTOSAR standard. For example, virtual machines or guest operating systems must ensure that the according task or ISR code, the task or ISR body, or task or ISR payload is executed by the underlying processor 3 according to the configured task or ISR priority and the configured task period or at occurrence of an interrupt.

In the present disclosure it is not differentiated between tasks, processes, threads, etc. Some real time operating systems like AUTOSAR OS for example, distinguish between tasks and Interrupt Service Routines (ISR) as the two major user code schedulable entities, and the given text follows this paradigm, but logically is not restricted to this set of user payload for a scheduler.

The tasks and ISR, besides their implementation of the application functionality in a virtual machine, require interacting with each other or with the system by the use of system services provided by the guest operating system or virtual machine.

In a virtualization environment, with an additional virtualization system, the virtualization system has no notion about tasks and ISRs, but only schedules virtual machines with each of them potentially containing an instance of a real-time guest operating system and their tasks- and ISR-loads.

According to an embodiment a software, an operating system, a virtual machine, having real time capabilities, guarantees a response within specified time constraints. Hard real-time constraints consider a missing deadline as a total system failure. In other words, in hard real-time systems all deadlines should be met. According to an embodiment, a real-time software, operating system or virtual machine must have predictable response times and behavior, in particular for the scheduling, the resource and memory management.

According to embodiments, the real-time requirements with demands for fast/deterministic response times for input events make it necessary to have high frequent operating system tasks in the system, with task periods down to 2 milliseconds or lower, resulting in a high number of task switches. Such tasks may be called high periodic tasks. For example, high periodic tasks are related to sensor inputs from a wheel rotation.

However, each task may have a different task period, due to a broad spectrum of functionalities and the distribution of labor between operating system tasks, resulting in a high number of tasks with different task periods, the task periods ranging from 2, 5, 10, 20, 50, 100 to 1000 milliseconds.

Figure 3:
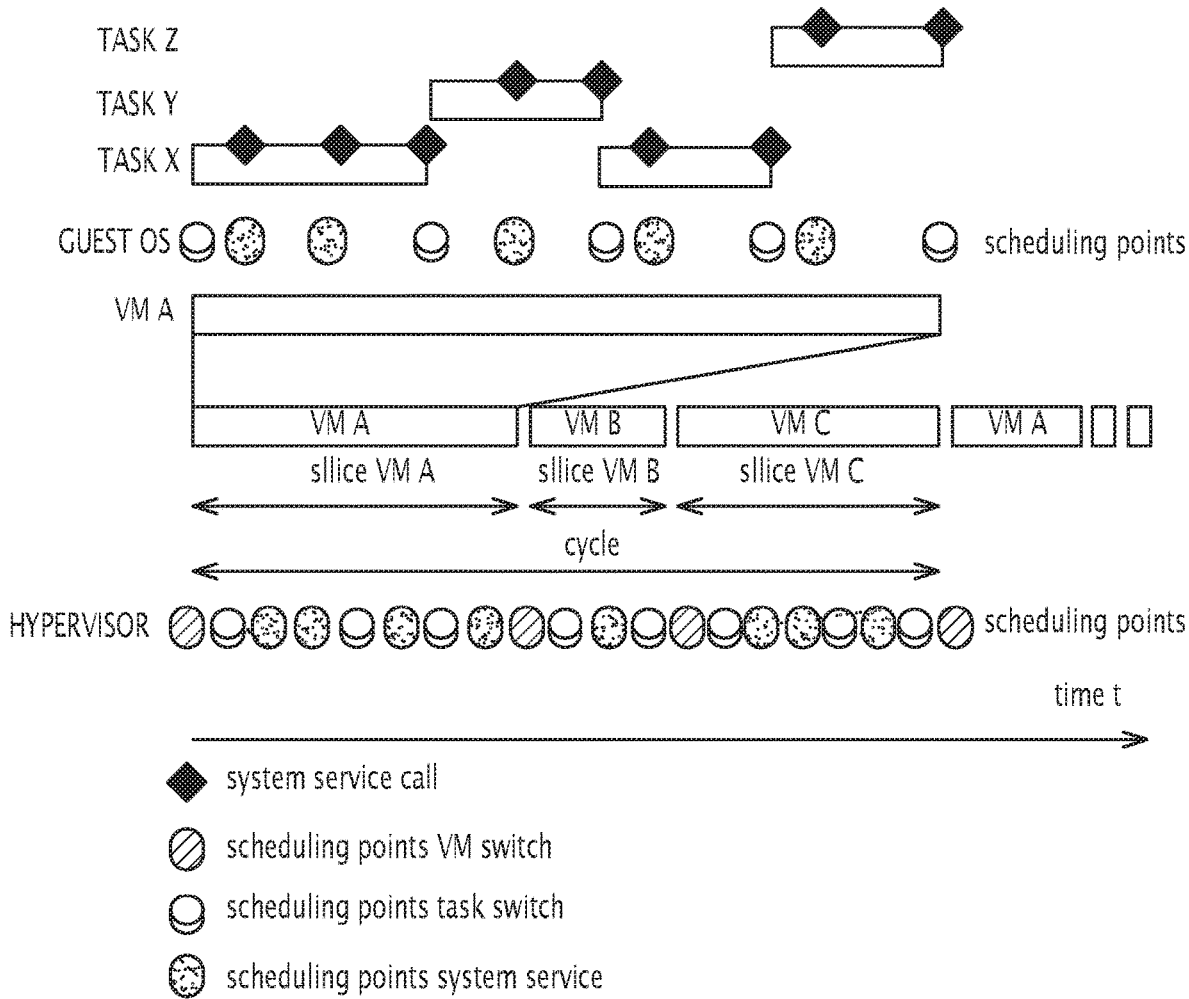
FIG. 3 shows schematically events generated by the switching of tasks and virtual machines.

FIG. 3 shows schematically an overview for virtual machine task executions, task switches, system service calls resulting in system calls, virtual machine switches, altogether producing scheduling events—scheduling points in the diagram—for the guest operating system or virtual machine and the virtualization system. Scheduling points are points in time when decisions about the allocation of system resources are made. The system of FIG. 3 includes three virtual machines, namely VM A, VM B and VM C and shows—exemplarily, illustrative—the scheduling activities in the virtual machine and the virtualization system. The virtual machines VM A, VM B and VM C are scheduled one after the other within a scheduling cycle period. After the end of the cycle period, the scheduling cycle starts from the beginning. Each virtual machine gets a share or time slice of the processing time.

The first virtual machine VM A includes three tasks X, Y and Z, which are executed on the processor one after the other. In the FIG. 3, the tasks are executed in the following sequence: X Y X Z. In other embodiments the tasks X, Y and Z may be also executed in another sequence. As it can be seen from FIG. 3, at each change of the task, a task switch is performed, for example by storing the user registers used by the processor of the previous task in a memory and to load the user registers of the new task from the memory into the registers of the at least one processor. The task switches are performed by the scheduler of the virtual machine. This may be also called scheduling point task switch, namely a point in time where the scheduler of the virtual machine becomes active. For embodiments without hardware-virtualization support, also the first level scheduler 30 of the virtualization system 22 will be involved in the task switch activity of the respective virtual machine.

Further, the scheduler 30 of the virtualization system 22 becomes active when the virtual machines are switched VM A, VM B and VM C, which is called in the drawings scheduling point VM switch.

Further, when a task has a system service call, the scheduler of the virtual machine and the scheduler 30 of the virtualization system 22 are activated, see scheduling point system service in FIG. 3.

Timer events (equivalent to the term timer tick) and the processing of the respective tasks may produce a substantial amount of system load and scheduling time. The need for high periodic tasks, for example which need to be scheduled every 2 ms, and disharmonic task periods, for example wherein a first task has to be scheduled every 2 ms, and a second task has to be scheduled every 5 ms, create a high number of timer events. According to embodiments, as it will be explained in the following, the virtual machines having respectively at least one real-time attribute. At least one the real time attribute of a first virtual machine is different to the corresponding real-time attribute of a second virtual machine. The real-time attribute are typically defined before the schedule of the virtual machines is determined. For example, the real time attribute may be a greatest common denominator of the task periods of the respective virtual machine or a maximal allowed execution time. In other embodiments, the real-time attribute is a set of task periods of the respective virtual machine. For each virtual machine, a set of task periods includes task periods of tasks of the virtual machine without task periods of tasks of the same virtual machine, which are multiples of other task periods.

According to an embodiment, the high periodic tasks are separated from the low periodic tasks and are assigned to the first VM. For example, a first virtual machine includes one or more periodic tasks to be handled within a first minimum task period and a second virtual machine including only one or more periodic tasks to be handled at least at a second minimum task period, being greater than the first minimum task period, wherein the first period is not a whole number factor of the second period. The minimum task period is, according to embodiments, the minimum task period of a set of task periods as explained above. For example, the first virtual machine may include periodic tasks having a minimum task period of 2 ms (milliseconds), whereas the second virtual machine includes periodic tasks having a minimum task period of 5 ms. In other words, the cycle period can be increased compared to embodiments, where each virtual machine could include high period tasks and low period tasks.

Here, for example, the real-time attribute corresponds to the set of task periods. In particular the tasks are provided such that the lowest task period in the first set of task periods of a first virtual machine is different to the lowest task period in the second set of task period, in particular to the lowest task period of the set of task periods of all other virtual machines, wherein, in particular the lowest task period of the first set of task periods is lower that the lowest task period of the second set of task periods and not a whole number factor of the lowest task period of the second set of task periods. For example, the FIGS. 6 to 9 show embodiments, where the high periodic tasks are isolated from the tasks having a low period.

For example in FIG. 6a, the system includes five virtual machines, namely VM A, VM B, VMC, VM D and VM E. The time is shown in the horizontal direction in microseconds (us), where the boxes relate to vCPU activity of the respective virtual machine, with box sizes in horizontal direction corresponding to vCPU active time. In other embodiments, the system may also include less or more virtual machines. Each virtual machine, for example, has the same processor share or time slice, here for example 20%. The virtual machine VM A includes periodic tasks having 2 ms, 5 ms and multiples of 2 ms, 5 ms periods, whereas the virtual machines VM B, VMC, VM D and VM E only include periodic tasks having 5 ms and multiples of 5 ms task periods. The cycle time is 10 ms, compared to 1 ms (GCD of 2 and 5), if each virtual machine would include tasks having 2 ms and 5 ms task periods. And the number of virtual machine switches is reduced significantly.

According to an embodiment, which may be combined with other embodiments disclosed herein, the virtual machines are scheduled not in a uniform way. In other words, the virtual machines are scheduled based on the task periods of the periodic tasks of the virtual machines. In other words, the virtual machines are scheduled by the scheduler when needed. In other words, the real-time attribute is in this case corresponds to the set of task periods.

Figure 4:
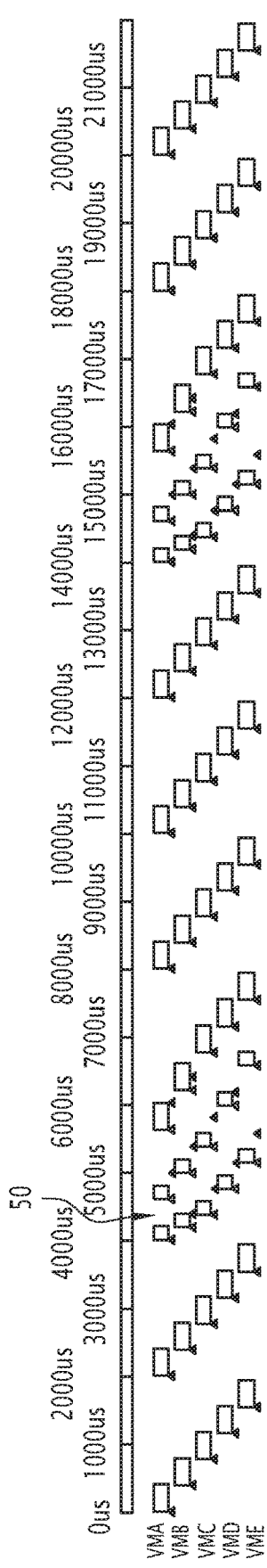
FIG. 4 shows an embodiment for scheduling virtual machines.

For example FIG. 4 shows an exemplary embodiment of such a given instance of a system configuration with the produced scheduling algorithm illustrated in graphical form, where the boxes relate to vCPU activity, with box sizes in horizontal direction corresponding to vCPU active time. The time is shown in the horizontal direction in microseconds (us). The given system includes five virtual machines, namely VM A, VM B, VMC, VM D and VM E. In other embodiments, the system may also include less or more virtual machines. In the given embodiment each virtual machine has the same processor share or time slice, here for example 20%. All virtual machines include periodic tasks having 2 ms and 5 ms task periods. In other words, each virtual machine must be scheduled every 2 ms and additionally at multiples of 5 ms. The first 4 ms of the cycle period in FIG. 4 shows a standard uniform round robin time division multiplexing scheduling as each virtual machine must be scheduled two times within that period, one after the other in a fixed sequence. After the 4 ms, the virtual machines VM A, VM B, VMC, VM D and VM E are scheduled, such that the 2 ms and 5 ms task periods are met by each virtual machine. The black triangles indicate, when a respective virtual machine should be started (desired scheduling time) and the white triangle indicates when the respective virtual machine is started (real scheduling time). Thus, for example the task to be scheduled with 5 ms task periods of the virtual machine VM A is started, see reference 50, before the 5 ms period expires. This results in a small jitter, which is the difference between the real scheduling time and the desired scheduling time. According to embodiments, the scheduling is optimized to reduce the jitter, such that the system still meets the real-time requirements.

The real-time attribute is in the case of FIG. 4 corresponds to the set of task periods.

According to an embodiment, the scheduler of the virtualization system is aware of the task periods of the tasks of the virtual machines. For example the scheduler of the virtualization system may store the task periods of the virtual machine.

In some embodiments, the nominal scheduling times of each virtual machine is determined by the scheduler or a configuration tool based on the task periods of the periodic tasks. Based on the nominal and/or desired scheduling times for each virtual machine, the real scheduling times are determined, such that the jitter that means the difference between the desired scheduling times and the real scheduling times is minimized. According to some embodiments, a maximal jitter tolerance may be defined.

The real-time operating system, i.e. the guest operating system (OS) of a virtual machine mainly serves periodic tasks. The guest OS, for its scheduling, relies on a configurable repeating or periodic timer, or counter, which is provided by the underlying platform, for example the virtualization system 22. In native (non-virtualized) systems the timer or counter function is realized in hardware, for example by the processor 3. On an expiry of one timer period, the OS is activated as an exception or interrupt, as a timer tick. In a virtualized environment the timer tick function is realized in software within the scheduler 30 of the virtualization system 22, if para-virtualization applies, or is introduced into the OS (of the virtual machine) as (virtualized) hardware event, if hardware virtualization support is provided. According to embodiments, the guest OS is adapted to treat timer ticks which do not occur periodically with equal sized increments in time, but do occur at different periods, adopted to the configured task period needs, e.g. at times 0, 2, 4, 5, 6, 8, etc ms in given example.

In other words, the scheduler of the virtualization system is adapted to create virtual timer events or timer ticks to provide the timer information for the virtual machines. The scheduler 34, 36, 38 of the scheduled virtual machine is adapted, to deduct from the timer information, how much time elapsed since the last timer event, and schedule the (periodic) tasks in that virtual machine accordingly.

It should be noted that the virtualization system, in particular the scheduler of the virtualization system only schedules the virtual machines or virtual processors (vCPUs) assigned to the virtual machines and has no notion about the tasks in the virtual machine other than their task periods, in order to know when a virtual machine must be scheduled.

According to an embodiment, the scheduling sequence is statically configured, in particular within a cycle period, for example using a scheduling schedule, for example a formal data structure, e.g. a table. Thus, the scheduling schedule is read by the scheduler of the virtualization system and the virtual machines are executed at runtime according to the given scheduling schedule.

Figure 5:
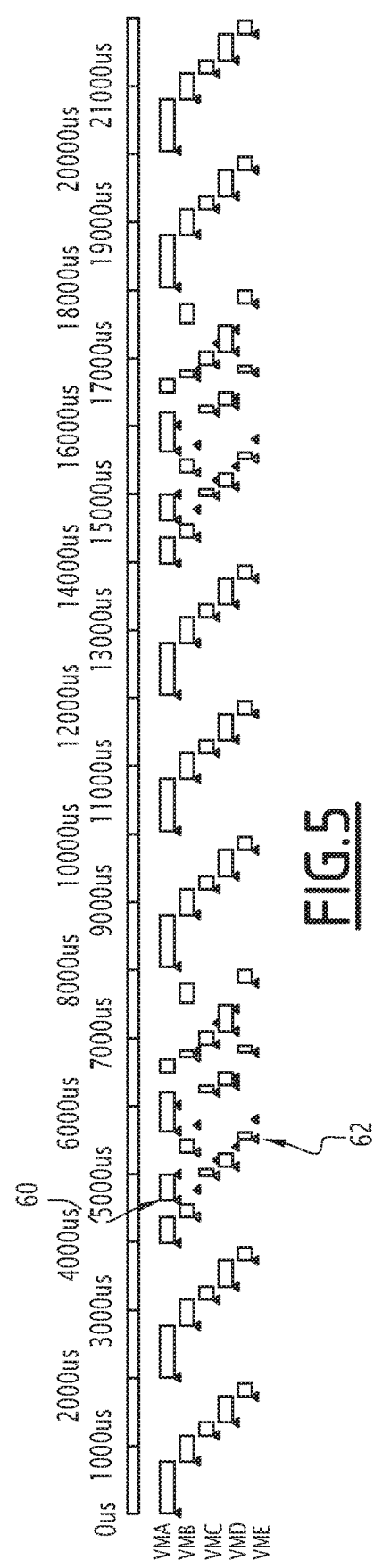
FIG. 5 shows another embodiment for scheduling virtual machines.
Figure 6:
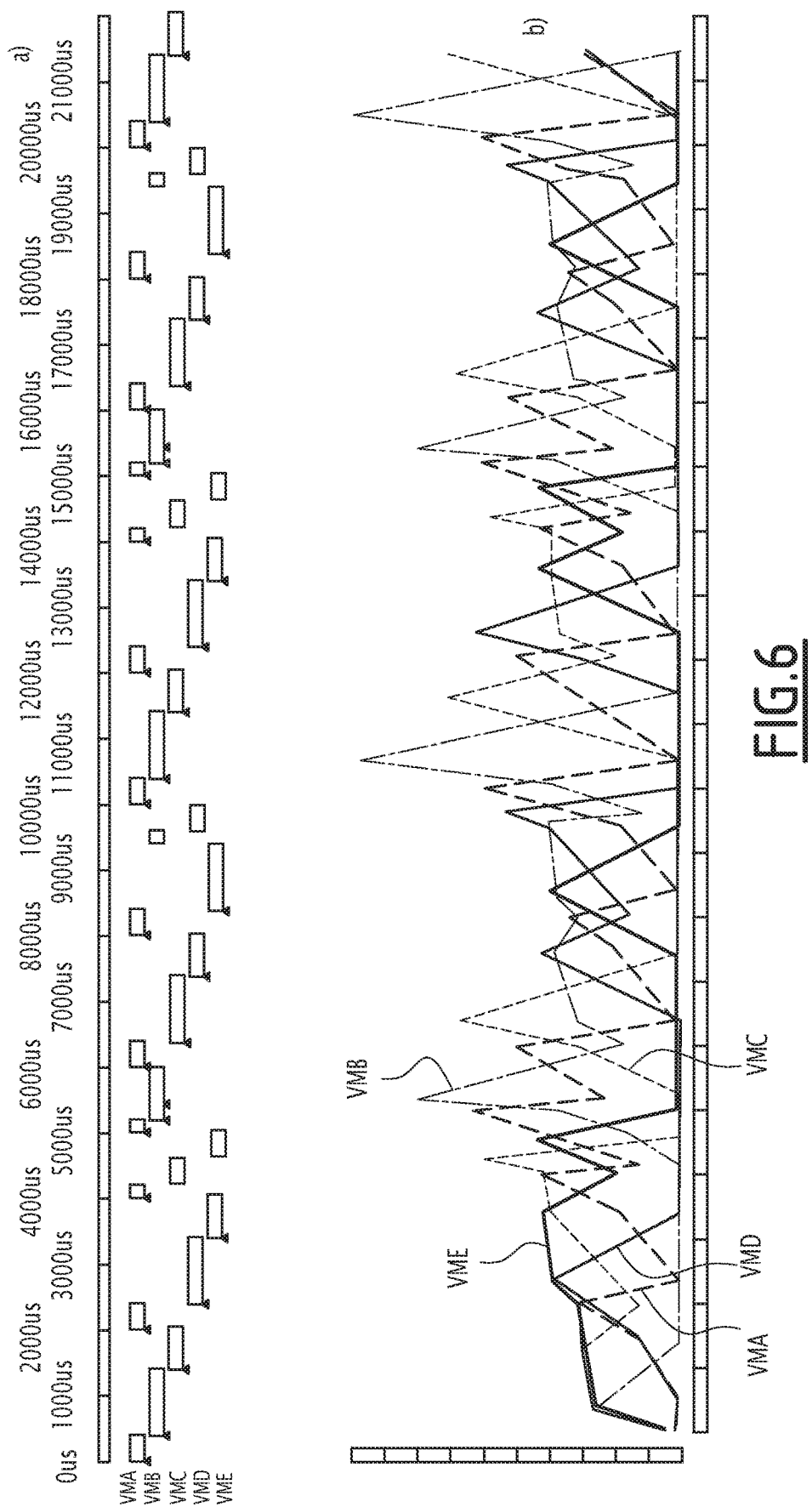
FIG. 6 shows a first embodiment for scheduling virtual machines.

FIG. 5 shows another embodiment of a non-uniform, aperiodic scheduling algorithm. The system includes five virtual machines, namely VM A, VM B, VMC, VM D and VM E. The time is shown in the horizontal direction in microseconds (us), where the boxes relate to vCPU activity of the respective virtual machine, with box sizes in horizontal direction corresponding to vCPU active time. The virtual machine VM A has a processor share of 40%, the virtual machines VM B and VM D have a processor share of 20% and the virtual machines VM C and VM E have a processor share or time slice of 10%. In other words, the virtual machines have a different share of the processing time. All virtual machines include periodic tasks having 2 ms and 5 ms task periods and multiples of 2 ms and multiples of 5 ms task periods. In other words, each virtual machine must be scheduled at multiples of 2 ms and multiples of 5 ms. The period until 4 ms in FIG. 4 shows a standard round robin time division multiplexing scheduling as each virtual machine must be scheduled two times within that period. After the 4 ms, the virtual machines VM A, VM B, VMC, VM D and VM are scheduled, such that the 2 ms and 5 ms task periods are met by each virtual machine. The black triangles indicate the nominal scheduling time when latest a respective virtual machine should be started (desired schedule) and the white triangle indicates when the respective virtual machine is started, i.e. the real scheduling time. Thus, for example the task to be scheduled with 5 ms task periods of the virtual machine VM A is started, see reference 60, before the 5 ms period expires. Another example is the virtual machine VM E, where the task to be scheduled with 2 ms task periods is started, see reference 62, before the 2 ms period expires. This might lead to a small jitter.

The real-time attribute is in the case of FIG. 5 corresponds to the set of task periods.

The number of virtual machine switches is reduced with such a constellation to 33 or 30 compared to the number of switches of 50 in case a standard time divisional multiple access would be used, where each virtual machine is scheduled regularly (every 1 ms).

In FIG. 6a, as already explained above, the non-uniform scheduling is combined with an isolation of time-critical tasks. The time is shown in the horizontal direction in microseconds (us), where the boxes relate to vCPU activity of the respective virtual machine, with box sizes in horizontal direction corresponding to vCPU active time. FIG. 6b shows the volatile eminence of the different virtual machines over time. The raise and fall of importance at distinct times for the VCPUs or VM A, B, C, D, and E can be seen from FIG. 6b. The black triangles indicate when a respective virtual machine should be started (nominal scheduling time) and the white triangle indicates when the respective virtual machine is started (real scheduling time). In such a case, only the virtual machine VM B presents a small jitter of 0.2 ms, whereas the other virtual machines have no jitter. The number of vCPU switches has been further reduced down to 18 (30 and 33 vCPU switches for previous examples above or 50 vCPU switches for non optimized scheduling).

The real-time attribute is in the case of FIG. 6a corresponds to the set of task periods.

Figure 7:
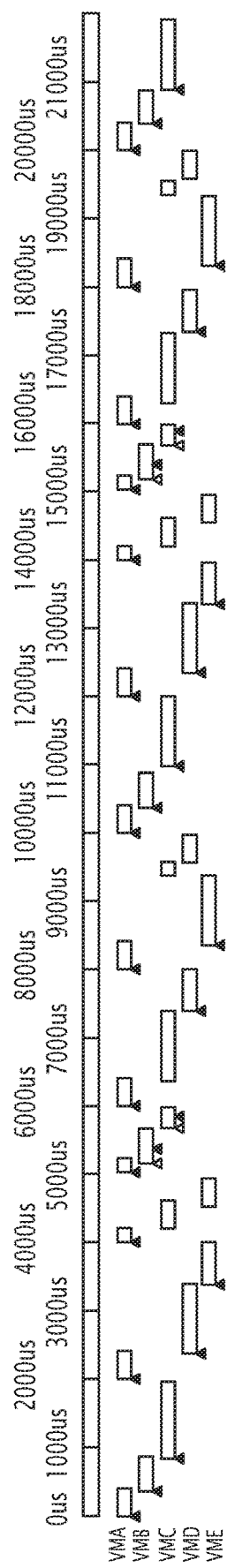
FIG. 7 shows a first embodiment for scheduling virtual machines.

FIG. 7 shows an embodiment, wherein the system includes five virtual machines, namely VM A, VM B, VMC, VM D and VM E. The time is shown in the horizontal direction in microseconds (us), where the boxes relate to vCPU activity of the respective virtual machine, with box sizes in horizontal direction corresponding to vCPU active time. The virtual machines VM A, VM D and VM E have each a processor share of 20%, the virtual machine VM B has a processor share of 10% and the virtual machines VM C has a processor share or time slice of 30%. The virtual machine VM A includes tasks having 2 ms and 5 ms task periods, whereas the virtual machines VM B, VMC, VM D and VM E only include tasks having 5 ms task periods and/or multiples of 5 ms. The black triangles indicate when latest a respective virtual machine must be started and the white triangle indicates when the respective virtual machine is started. In such a case, only the virtual machines VM B and VM C present a small jitter of 0.2 ms, whereas the other virtual machines have no jitter. With such a configuration, the number of virtual machine switches can be reduced to 18 or 19 compared to 50 for a non-optimized system.

The real-time attribute is in this case corresponds to the set of task periods.

Figure 8:
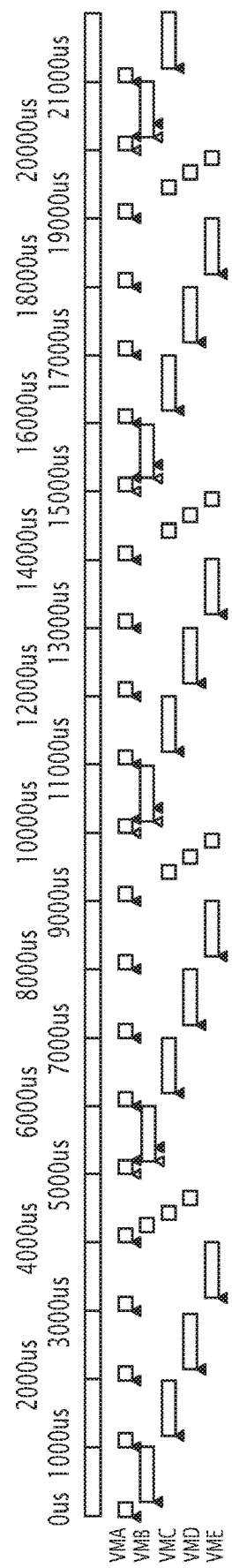
FIG. 8 shows a first embodiment for scheduling virtual machines.

In FIG. 8, as another example, the system includes five virtual machines, namely VM A, VM B, VMC, VM D and VM E. The time is shown in the horizontal direction in microseconds (us), where the boxes relate to vCPU activity of the respective virtual machine, with box sizes in horizontal direction corresponding to vCPU active time. Each virtual machine has a processor share or time slice of 20%. The virtual machine VM A includes tasks requiring 1 ms timer ticks as greatest common denominator for all task periods within VMA, whereas the virtual machines VM B, VMC, VM D and VM E only include tasks having 5 ms or multiples thereof task periods. In other words, the greatest common denominator for the virtual machines VM B, VMC, VM D and VM E is 5 ms. The black triangles indicate when latest a respective virtual machine must be started. In such a case, all virtual machines have no jitter, and 26 vCPU switches are taken place. For example, in this case the real time attribute may be a greatest common denominator of the task periods of the respective virtual machine.

Figure 9:
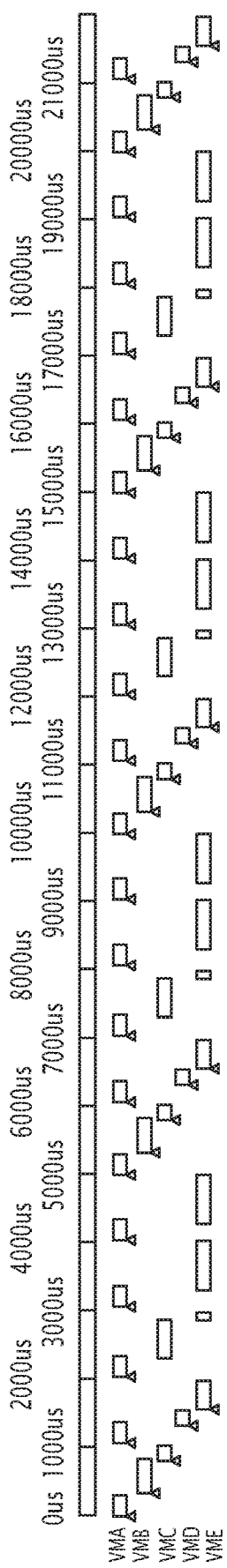
FIG. 9 shows a first embodiment for scheduling virtual machines.

FIG. 9 shows an embodiment, wherein the system includes five virtual machines, namely VM A, VM B, VMC, VM D and VM E. The time is shown in the horizontal direction in microseconds (us), where the boxes relate to vCPU activity of the respective virtual machine, with box sizes in horizontal direction corresponding to vCPU active time. The virtual machine VM A has a processor share of 30%, the virtual machines VM B has a processor share or time slice of 10%, the virtual machine VM C has a processor share or time slice of 15%, the virtual machine VM D has a processor share or time slice of 5% and the virtual machines VM E has a processor share or time slice of 40%. The virtual machine VM A includes tasks having 1 ms timer ticks as greatest common denominator for all task periods, whereas the virtual machines VM B, VMC, VM D and VM E only include tasks having 5 ms task periods or multiples of 5 ms. The black triangles indicate when latest a respective virtual machine must be started. In such a case, all virtual machines have no jitter. For example, in this case the real time attribute may be the greatest common denominator of the task periods of the respective virtual machine.

Figure 10:
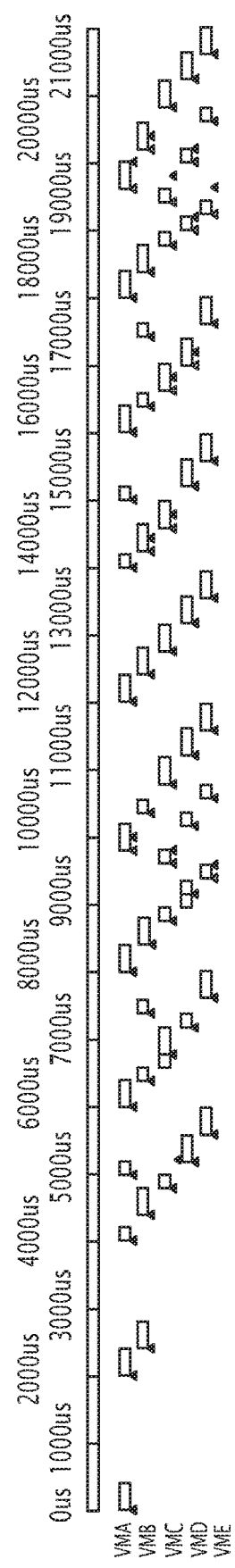
FIG. 10 shows a first embodiment for scheduling virtual machines.

FIG. 10 shows an embodiment, where the system is configured to have phase shifts defined per vCPU. The configuration shown in FIG. 10 is the same as in FIG. 4, with the only difference that phase shifts are applied. Thus, the local time for each virtual machine is shifted with respect to the others. The second vCPU, assigned to VM B starts two time slots with the size of granularity G (here: 1 ms) later than the first vCPU assigned to VM A at time 2400 microseconds (in the drawings abbreviated with us). The third VCPU assigned to VM C is still further delayed and starts at time 4800 us followed by VCPU 4 assigned to VM D starting at 5200 us and VCPU 5 assigned to VM E start time at 5600 us. With given offsets/phase shifts the maximal jitter values for VCPUs 2 and 4 is decreased down to 200 us from 400 us and fewer jitter occurrences are created. The real-time attribute is in this case corresponds to the set of task periods.

Figure 11:
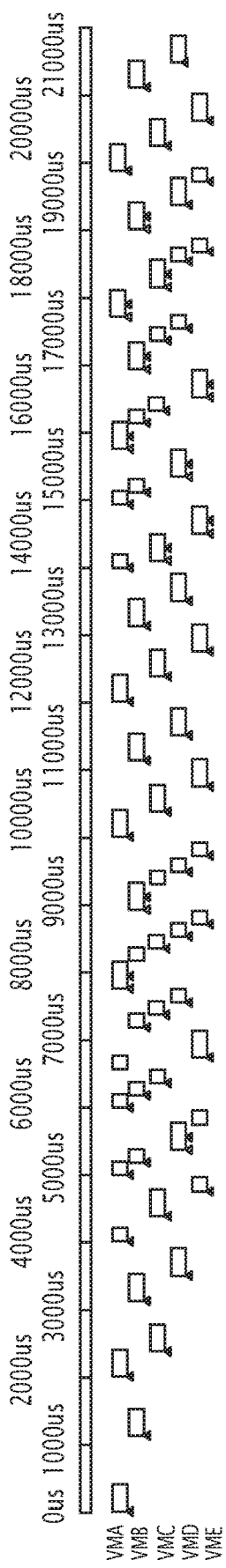
FIG. 11 shows a first embodiment for scheduling virtual machines.

FIG. 11 shows an embodiment similar to FIG. 10 with different phase shifts and further reduction of the maximal jitter values for all VCPUs down to 200 us and further reduction of jitter occurrences. The real-time attribute is in this case corresponds to the set of task periods.

According to some embodiments, the control unit has hard real-time constraints, requirements for low interrupt latency, and/or stringent end-to-end response time requirements between an input event, for example from a sensor, and an output activity, for example on an actuator. For example, control units may be responsible for crash blinking, adaptive cruise control, keyless entry and the like.

According to an embodiment, the system 20 is statically configured. For example, they provide a deterministic runtime behavior.

According to the invention, such a system is suitable for control units having a high number of events, periodic and/or sporadic, a fine granularity of timer events, for example as every 2 milliseconds, a high number of input/output ports with accordingly high number of input/output operations, for example one hundred and more input/output ports per control unit, a high number of tasks and task switches and having a low footprint control unit. For example, low footprint, low costs control units have processors with a relative low processing power, a limited amount of memory, no memory management unit.

In the following a method for configuring a system, for example a system on the control unit 1 is described. The method may be implemented using a prebuilt configuration tool to configure the target system, which—the target system—is installed on the control unit 1.

According to embodiments, the overall system-, or subsystem-functionality is decomposed into multiple parts, allowing for modularization, specialization and re-use. In some embodiments, the decomposition follows standardized architecture models (e.g. OSI, AUTOSAR) and/or comprises the handling of input/sensor data, data en-, de-coding, processing and calculation and the generation of an output signal or actuator stimulus of a vehicle (e.g. from crash detection to emergency call and/or crash-blinking). Each part is assigned to a respective task will be executed according to the specified real-time attributes like task priority, maximum allowed response time and/or task period.

In other words, one or more periodic tasks and their real-time attributes are determined. For example, the task periods depend on the sensor detection periods, e.g. for wheel rotation sensors. In other words, according to embodiments, some of the tasks, in particular all of the periodic tasks are associated to vehicle applications or vehicle sensor data.

In some embodiments, which may be combined with other embodiments disclosed herein, the real-time attributes depend on the needs of an underlying hardware controller, hardware queue sizes, software memory and queue sizes, defined maximum allowed response times and other real-time acceptance criteria, for example defined with the control unit 1. As an example, the assignment of task periods is application specific but usually results in a multitude of tasks and task periods ranging from 2 milliseconds to 1 second (for example for the automotive real-time domains body, chassis, powertrain etc.).

According to an embodiment, the tasks are assigned to different virtual machines depending on their real-time attributes.

In an example, the tasks are attributed to the different virtual machines depending on the maximal allowed response time. For example tasks with a first maximal allowed response time are assigned to a first virtual machine and tasks with a second maximal allowed response time being greater than the first maximum allowed response time are assigned to a second virtual machine.

In an embodiment, which may be combined with other embodiments disclosed herein, for each virtual machine (VM) a set of tasks periods and their greatest common denominator (GCD) is determined. The tasks are attributed to different VMs, such that at least two VMs, in particular each VM has a different GCD of the task periods of the set of tasks. In a particular example, the GCD of the tasks periods of the set of task periods of a first VM may be not a whole number factor of the GCD of task periods of the set of task periods of a second VM.

In another example, the tasks are attributed to different VMs, such that the lowest task period of the set of task periods of a first VM is different to the lowest task period of a set of task periods of a second VM. In a particular embodiment, the lowest task period of a set of task periods of a first VM is not a whole number factor of the lowest task period of a set of task periods of a second virtual machine or all other VMs. Thus, the first virtual machine has different requirements, regarding the nominal scheduling times and/or the real-time requirements, compared to the remaining virtual machines, as it will be explained later.

According to an embodiment, then or in a previous step, the share of each virtual machine within a cycle period is determined, specifying the slice time for each virtual machine. This may depend on the processing efforts of each task, the number of tasks in each virtual machine and/or other factors. For example, each VM may have the same share. In other embodiments, at least two VMs have different shares.

In another step the nominal scheduling times for each virtual machine based on the one or more task periods or the set of task periods is determined. For example, this may be done by the different steps detailed above. In a simple example, if the virtual machine includes only one task with a task period of 2 ms, the nominal scheduling times X or time slots are 0 ms, 2 ms, 4 ms, 6 ms, . . . k×2 ms, k being an integer, with k={0, . . . , ∞}, wherein 2 ms is equal the cycle period.

For example, if we have n tasks, each having the task period $P_n$, then the nominal scheduling times X in time t will be X={k*P1, k*P2, . . . , k*Pn} for k∈N, k={0, . . . , ∞}.

With this invention, the hypervisor granularity for scheduling, the entities for scheduling, remain to be virtual CPU's (vCPU's), but, via configuration, the hypervisor gets the knowledge of task periods for the virtual machines, in order to be able to schedule the virtual machines based on their scheduling needs, which is defined by the task periods and the at least one real-time attribute.

In a further step real scheduling times based on the nominal scheduling times X and the share of each virtual machine within a cycle period are determined, for example taking into account the eminence indicator, as indicated above. To each nominal scheduling time a real scheduling time is associated. The real scheduling times are for example determined, such that within a cycle period at least one of the virtual machines is scheduled at least two times, three times or four times within the cycle period, wherein the sequence of scheduling the virtual machines is variable within the cycle period, such that the number of virtual machine switches is reduced. For example, in some embodiments, the real scheduling times are determined to reduce the difference between the desired and/or nominal scheduling time and the real scheduling time is minimized. In an embodiment, the scheduling sequence may be VM A, VM B, VM C, VM A, VM D, VM B, VM E . . . , and the time slice for each virtual machine may be different.

According to some embodiments, a phase shift is provided for at least one virtual machine, in order to reduce the stress, wherein the stress is, for any scheduling point for a given virtual machine, the minimal distance in time to the next scheduling points for all other virtual machines, in particular for nominal scheduling points.

Finally, after the real scheduling times are determined, these are stored as a scheduling schedule to be read by a scheduler of the virtualization system.

Then, the scheduler 30 of the virtualization system 22 reads the scheduling schedule and switches to the virtual machine according to the scheduling schedule.

According to the invention it is possible to make virtualization possible in small footprint systems, providing handling complexity, multi-core architecture, functional safety, security, software integration, software change and software update. The embodiments enable to significantly reduce the scheduling points for the hypervisor and virtual machines for task switches and virtual machines switches, in order to make a virtualization solution possible for small processors.

The invention claimed is:

1. A control unit comprising:
at least one processor;
at least one memory connected to said at least one processor; and
a virtualization system comprising a scheduler scheduling a plurality of virtual machines running on the virtualization system, each virtual machine comprising a plurality of periodic tasks having respective task periods, wherein the set of task periods of a respective virtual machine includes task periods of tasks of the virtual machine without task periods of tasks of the same virtual machine which are multiples of other task periods, wherein at least one virtual machine has a set of task periods including two task periods, the scheduler assigning processing time to each of the virtual machines according to a predetermined fixed sequence of virtual machine switches forming a cycle period, which is repeated, the cycle period being the minimum time period after which the scheduling is repeated,
wherein said virtualization system and the virtual machines are real-time systems, the virtual machines having respectively at least one real-time attribute, wherein at least one of the real time attributes of a first virtual machine is different than at least one of the corresponding real-time attributes of a second virtual machine, and wherein one of the real-time attributes is a set of task periods,
wherein the predetermined fixed sequence of virtual machine switches is calculated based on the at least one real time attribute, and
wherein the predetermined fixed sequence of virtual machine switches comprises scheduling according to the individual task periods of the set of task periods of the respective virtual machine, and
wherein said scheduler switches the virtual machines according to the predetermined fixed sequence.

2. A control unit according to claim 1, wherein one of the real-time attributes is a maximum allowed response time.

3. A control unit according to claim 1, wherein one of the real-time attributes is a greatest common denominator of the task periods of the respective virtual machine, and wherein the predetermined fixed sequence of virtual machine switches comprises periodic scheduling the virtual machines according to the greatest common denominator of the task periods of the respective virtual machine.

4. A control unit according to claim 1, wherein within a cycle period at least one of the virtual machines is scheduled at least two times, and wherein the sequence of the scheduled virtual machines is variable within the cycle period.

5. A control unit according to claim 1, wherein the lowest task period of the first set of task periods is lower than the lowest task period of the second set of task periods and not a whole number factor of the lowest task period of the second set of task periods.

6. A control unit according to claim 1, wherein the scheduling of a first virtual machine is shifted in time with respect to the scheduling of a second virtual machine by at least one task period granularity, the task period granularity being the greatest common denominator of the task periods of all virtual machines.

7. A control unit according to claim 1, wherein each virtual machine has a predetermined share of the cycle period.

8. A control unit according to claim 7, wherein each virtual machine has a same share of the cycle period.

9. A control unit according to claim 7, wherein the virtual machines have unequal shares of the cycle period.

10. A control unit according to claim 1, further comprising an SRAM.

11. A control unit according to claim 1, wherein said at least one memory is a NOR-Flash for storing program code.

12. A method for operating a control unit comprising at least one processor, at least one memory connected to the at least one processor, and a virtualization system comprising a scheduler scheduling a plurality of virtual machines to assign processing time to each of the virtual machines according to a predetermined fixed sequence of virtual machine switches forming a cycle period, which is repeated, the cycle period being the minimum time period after which the scheduling is repeated, wherein each virtual machine includes a plurality of periodic tasks having respective task periods, wherein the set of task periods of a virtual machine comprises task periods of tasks of the virtual machine without task periods of tasks of the same virtual machine which are multiples of other task periods, wherein at least one virtual machine has a set of task periods including two task periods, wherein the virtualization system and the plurality of virtual machines are real-time systems, the virtual machines having respectively real-time attributes, wherein a real time attribute of a first virtual machine is different than a real-time attribute of a second virtual machine, and wherein one of the real-time attributes is a set of task periods, the method comprising:
   calculating the predetermined fixed sequence of virtual machine switches based on the at least one real time attributes, comprising scheduling according to the individual task periods of the set of task periods of the respective virtual machines; and
   switching, by the scheduler, to the first virtual machine according to the predetermined sequence calculated by said calculating.

13. A method for operating a control unit according to claim 12,
   wherein one of the real-time attributes is a greatest common denominator of the task periods of the respective virtual machine, and
   wherein said calculating comprises periodically scheduling the virtual machines according to the greatest common denominator of the task periods of the respective virtual machines.

14. A method for operating a control unit according to claim 12, wherein the lowest task period of the first set of task periods is lower than the lowest task period of the second set of task periods and not a whole number factor of the lowest task period of the second set of task periods.

15. A method for operating a control unit according to claim 12,
   wherein within a cycle period at least one of the virtual machines is scheduled at least two times, and
   wherein the sequence of the scheduled virtual machines is variable within the cycle period.

16. A method for operating a control unit according to claim 12, wherein the scheduling of a first virtual machine is shifted in time with respect to the scheduling of a second virtual machine by at least one task period granularity, the task period granularity being the greatest common denominator of the task periods of all virtual machines.

17. A method for configuring a virtualization system of a control unit, the control unit comprising at least one processor and at least one memory connected to the at least one processor, a virtualization system comprising a scheduler scheduling a plurality of virtual machines to assign processing time to each of the virtual machines according to a predetermined fixed sequence of virtual machine switches forming a cycle period, which is repeated, the cycle period being the minimum time period after which the scheduling is repeated, wherein the virtualization system and the plurality of virtual machines are real-time systems, the virtual machines having respectively real-time attributes, wherein each virtual machine comprises a plurality of periodic tasks having respective task periods, the method comprising:
   determining the real-time attributes of each task;
   assigning the tasks to different virtual machines, such that a first virtual machine has a different real-time attribute than a second virtual machine;
   determining a set of task periods, wherein the set of task periods of a respective virtual machine comprises task periods of tasks of the virtual machine without task periods of tasks of the same virtual machine which are multiples of other task periods, and wherein the real-time attribute is a set of task periods and at least one virtual machine has a set of task periods including two task periods;
   determining a share of each virtual machine within a cycle period;
   determining nominal scheduling times for each virtual machine based on the real time attributes of the virtual machines;
   determining real scheduling times based on the nominal scheduling times and the share of each virtual machine within a cycle period;
   storing the real scheduling times, wherein the scheduling schedule represents the predetermined fixed sequence of virtual machine switches; and
   reading and executing the scheduling schedule by the scheduler.

18. A method according to claim 17 further comprising determining a greatest common denominator of the task periods of each virtual machine, wherein the real-time attribute is a greatest common denominator of the task periods of the respective virtual machine.

19. A method according to claim 17, further comprising:
   determining at least one of stress and number of virtual machine switches per a predetermined period of time; and
   shifting all nominal scheduling times of at least a first virtual machine with respect to the all nominal scheduling times of a second virtual machine by at least one task period granularity in order to reduce at least one of the stress and the number of virtual machine switches to be performed by the scheduler,
wherein the stress is, for any scheduling point for a given virtual machine, the minimal distance in time to the next scheduling points for all other virtual machines.

* * * * *